United States Patent [19]
Schneider

[11] Patent Number: 5,797,175
[45] Date of Patent: Aug. 25, 1998

[54] PROCESS FOR CONNECTING AN INSERT TO A SHEET TO FORM A JOINT DESIGNED TO BE SECURED AGAINST ROTATION AND INSERT EJECTION

[75] Inventor: Wilhelm Schneider, Schwabach, Germany

[73] Assignee: Richard Bergner GmbH & Co., Schwabach, Germany

[21] Appl. No.: 796,190

[22] Filed: Feb. 7, 1997

Related U.S. Application Data

[63] Continuation of Ser. No. 367,125, Jan. 6, 1995, abandoned.

[30] Foreign Application Priority Data

Aug. 24, 1992 [DE] Germany .................. 92 11 342.7
Jul. 7, 1993 [DE] Germany .................. 92 09 059.1

[51] Int. Cl.$^6$ .................................................. B21D 39/00
[52] U.S. Cl. .................................... 29/520; 411/180
[58] Field of Search ........................ 29/515, 520, 521; 411/180

[56] References Cited

U.S. PATENT DOCUMENTS

| 1,579,875 | 4/1926 | Lundberg . |
| 2,177,191 | 10/1939 | Sandberg . |

(List continued on next page.)

FOREIGN PATENT DOCUMENTS

| 558873 | 1/1958 | Belgium . |
| 0437011 | 7/1991 | European Pat. Off. . |
| 1515386 | 3/1968 | France . |
| 631051 | 5/1936 | Germany . |
| 1942770 | 7/1966 | Germany . |
| 1943684 | 8/1966 | Germany . |
| 2656232 | 6/1977 | Germany . |
| 3003908 | 10/1984 | Germany . |
| 2545581 | 9/1986 | Germany . |
| 3510300 | 9/1986 | Germany . |
| 3704763 | 10/1988 | Germany . |
| 4010598 | 10/1990 | Germany . |
| 34-20536 | 12/1934 | Japan . |
| 1524047 | 9/1978 | United Kingdom . |
| 1561993 | 3/1980 | United Kingdom . |

OTHER PUBLICATIONS

Technical Journal "Drahtwelt" |World of Wires|, vol. 5, 1975, p. 173.

Müller, R., "Hochbelastbare Verbindung" *Industrie Anzeiger*, 17/1991, pp. 31–34.

German Catalog GTO pressti, Brothers Titgemeyer, Osnabrück, Germany.

"Bolts for Securing Components", *Automobiltechnische Zeitschrift*, 88 (1986), 9, p. 486.

*Primary Examiner*—David P. Bryant
*Attorney, Agent, or Firm*—Spencer & Frank

[57] ABSTRACT

A process for inserting an insert element into a flat sheet metal piece to form a connected element includes the steps of providing the insert element with a head and a shank. A concentric annular groove forms a constriction between the head and the shank. A plurality of separate projections are circumferentially arranged on a seating surface of the head and provide a twisting resistance between the insert element and the sheet metal piece. Each separate projection has a length that extends approximately radially relative to a longitudinal axis of the insert element. The sheet metal piece is provided with a perforation for receiving the shank. The perforation has an edge that forms a collar that projects out from a plane defined by a surface of the sheet metal piece. The shank is inserted through the perforation, and is pressed toward the sheet metal piece to cause the collar to be bent in a direction toward the plane so that the collar is essentially level with the surface of the sheet metal piece in a region between adjacent projections. The pressing causes the seating surface to firmly rest against the surface of the sheet metal piece, and causes a reduction in the perforation diameter so that the collar fills the annular groove, and so that only the projections enter the sheet metal piece in an axial direction.

3 Claims, 11 Drawing Sheets

U.S. PATENT DOCUMENTS

| | | |
|---|---|---|
| 3,060,562 | 10/1962 | Fransson et al. . |
| 3,079,970 | 3/1963 | Barry . |
| 3,124,031 | 3/1964 | Knohl . |
| 3,125,146 | 3/1964 | Rosan ........................... 411/180 |
| 3,133,579 | 5/1964 | Grimm et al. ................. 411/180 |
| 3,253,631 | 5/1966 | Reusser . |
| 3,736,969 | 6/1973 | Wärn et al. . |
| 4,432,681 | 2/1984 | Capuano . |
| 4,637,766 | 1/1987 | Milliser ........................ 411/180 |
| 4,779,326 | 10/1988 | Ichikawa ..................... 411/180 |
| 5,335,411 | 8/1994 | Muller et al. ................. 411/180 |
| 5,513,933 | 5/1996 | Rom ............................ 411/180 |
| 5,531,552 | 7/1996 | Takahashi et al. ........... 411/180 |

PROCESS FOR CONNECTING AN INSERT TO A SHEET TO FORM A JOINT DESIGNED TO BE SECURED AGAINST ROTATION AND INSERT EJECTION

This application is a continuation of application Ser. No. 08/367,125 filed Jan. 6, 1995, now abandoned.

BACKGROUND OF THE INVENTION

The invention relates to an insert element having a longitudinal axis and being connectable to a flat sheet metal piece to be nonrotatable and nonejectable. The insert element includes a head coaxially positioned on the longitudinal axis, and having a width defining a first diameter, and a seating surface extending essentially radially relative to the longitudinal axis. A shank is connected to and concentric to the head. The shank has a width defining a second diameter smaller than the first diameter. The shank axially extends on one side of the head from the seating surface. A transition area is defined by the connection between the head and the shank. The transition area has a concentric annular groove forming a constriction. The groove has a depth, and is open toward an exterior of the insert element. The annular groove receives the sheet metal piece. Such an insert element can be a bolt or a screw or an element with an inner thread, similar to a nut.

Insert elements of the above mentioned type in the form of insert screws are the subject of DE 25 45 581 C, for example. In the form of insert nuts they are known, for example, from -the technical journal "Drahtwelt" [World of Wires], 5-1975, p. 173.

After having been inserted into a sheet metal piece, insert elements of the previously mentioned type no longer require a steadying piece to screw on a nut or screw in a threaded bolt. This means a considerable savings in assembly, and in repairs. Furthermore, there are occasions where the insert element is no longer accessible for installing a steadying piece after installation.

A disadvantage of an insert screw of the known type lies in that it has a defined minimum grip length. In a normal screw the grip length is equal to the distance between the seating surface of the screw head and the thread end at the side of the head of an element with an inner thread screwed on the screw shank. With the previously mentioned insert screw this minimum grip length is reduced by four longitudinal sections. Two of these longitudinal sections are used to assure resistance against relative twisting and resistance against being ejected. With the previously mentioned screw, resistance against relative twisting is provided by a collar with radially projecting arms placed on the screw head and extending beyond the shank diameter, which become embedded into the flat stock when being compressed, so that the latter flows into the spaces between the arms (DE 25 45 581 C2)

The resistance against being ejected is obtained by means of an annular recess located below this collar used for twisting resistance, into which the material displaced by the radial arms is pushed. Following the annular recess are a calibrating collar and a conventional thread end. So that the annular recess can be filled with an amount of displaced material sufficient to assure resistance against being ejected, it is necessary that the dimensions of the radial arms and the annular recess be matched to the respective sheet metal thickness. It is accordingly necessary to provide different screws depending on the thickness of the sheet metal to be worked. The disadvantages in respect to maintaining stocks and logistics are obvious.

A further disadvantage of the already known screw lies in that in the connected state the sheet metal thickness is reduced on account of the displacement of material by the radial arms of the collar used as twisting resistance. Because of this the joint is weakened in the area of the undercut of the annular recess, which determines the resistance against ejection.

In connection with the insert element embodied as an element with an inner thread, described in the technical journal "Drahtwelt", the ejection resistance, i.e. fixing in the axial direction, is accomplished by the displacement of material into an undercut area. In this case an annular projection with a serration protruding in the axial direction is used as the displacement element on the underside of the head of the insert element. When the insert element is pressed into the perforation of a sheet metal piece, the annular projection penetrates into the sheet metal material and displaces it into an undercut area. This insertion element also has the disadvantage of the weakening, described above, of the joint by reducing the sheet metal thickness.

Insertion elements embodied as elements with an inner thread are also known which have a tubular shank which is connected to their head, countersunk and serrated on its circumference. The serration is used as ejection resistance in the connected state. Because of the inner countersinking of the shank end terminating in the interior thread, it is possible to firmly connect the insertion nut in the manner of a tubular rivet with a perforation preformed in the flat stock. The main disadvantage of these insertion elements is that it is necessary to adapt the length of the tubular shank to the respective sheet metal thickness. This results in extensive stock keeping and logistics.

SUMMARY OF THE INVENTION

It is the object of the invention to provide insert elements of the type mentioned at the outset with good twisting and ejection resistances, which do not have the disadvantages of the prior art, particularly those which, with the same dimensions, can be inserted in the same way into flat stock of different wall thickness and which in their embodiment as insert screws have a comparatively greater screw-in or shank lengths. This object is attained by the shaping of the insert element to include a groove having a depth. The depth extends from a direction of the shank in a generally axial direction and up to the seating surface. A plurality of projections are circumferentially arranged on the seating surface in an area beyond the width of the shank. The projections provide a twisting resistance between the insert element and the sheet metal piece.

The compression process for producing such an insert element is also contemplated by the present invention. In the embodiment of the insert element as a screw or bolt, the shaping at the side of the shank of the flank of the annular chamber, caused by compression because of the adjoining cutting into the shank of an annular groove which is concentric with a longitudinal axis, is particularly advantageous if the inner diameter of the annular groove is less than the diameter of the threaded core of an element with an interior thread or of a nut to be screwed on. In this case this annular groove is used as the thread end at the head of the exterior thread.

A further part of the invention relates to the process of inserting an insert element in accordance with the invention into flat stock. For this purpose the flat stock is provided with perforations in the shape of a collar protruding from its flat surface whose width has an interior diameter sufficient for passing the shank of the screw through. This causes a buildup of materials in the area of the circumference of the shank. During the insert process this built-up material is available for insertion into the annular space between the shank element and head element and in this way assures in a particularly perfect way the sought-after ejection resistance. Because of this no flow deformation caused by the material displacement process is required for entering of the flat stock into the annular space. In this way the flat stock is not weakened in the area important for the ejection security and, in connection with thin sheet metal pieces, for the total stability of the joint, such as is the case with the insert elements in accordance with the prior art. This advantageous effect is further improved if the edge of the perforation of the collar is bent inward in an approximately radial direction in respect to the longitudinal axis of the insert element. In this case the buildup of material in the area of the edge of the perforation is increased once more. In addition, insertion of the insert part is made easier because the perforation edge of the collar is already radially aligned and need not be bent in this direction by the application of a pressure force.

The subject of the invention will be described in detail by means of exemplary embodiments represented in the drawing figures. Shown are in:

BRIEF DESCRIPTION OF THE DRAWINGS

FIG. 1, a lateral view of an insert screw in accordance with the invention, partially in section along the section line I—I in FIG. 2, FIG. 2, a bottom view of the screw head in the direction of the arrow II in FIG. 3, FIG. 3, a lateral view, analogous to FIG. 1, of the blank of the insert screw with the underside of the screw head already shaped by compression, FIG. 4, a representation of the insert screw, analogous to FIG. 1, in its initial joint position in respect to a sheet metal support already prepared for this, FIG. 5, a representation, analogous to FIG. 4, in a relative position between the insert screw and the sheet metal support at the start of the insert process, FIG. 6, a representation, analogous to FIG. 5, with an alternate design of the sheet metal support, FIG. 7, a representation, analogous to FIGS. 4, 5 and 6, of the insert screw completely inserted into the sheet metal support, FIG. 8, a detailed view of the area VIII of FIG. 4, FIG. 9, a lateral view of an exemplary embodiment of an insert screw with a countersunk head, FIG. 10, an exemplary embodiment of an insert screw wherein the top of the screw head is embodied for insertion into a flat element, FIG. 11, an enlarged detailed section of the area XI in FIG. 10, FIG. 12, a top view of the top of the screw head in the direction of the arrow XII in FIG. 10, FIG. 13, a sectional view of an insert nut in its initial joint position analogous to FIG. 4, FIG. 14, a representation, analogous to FIG. 7, of the insert nut completely inserted into the sheet metal support, FIG. 15, a sectional view of the blank of an insert nut, FIG. 16, a representation, analogous to FIG. 15, with a widened shank part, FIG. 17, a representation, analogous to FIG. 16, with an interior thread cut in.

DETAILED DESCRIPTION OF THE INVENTION

Figure 1:
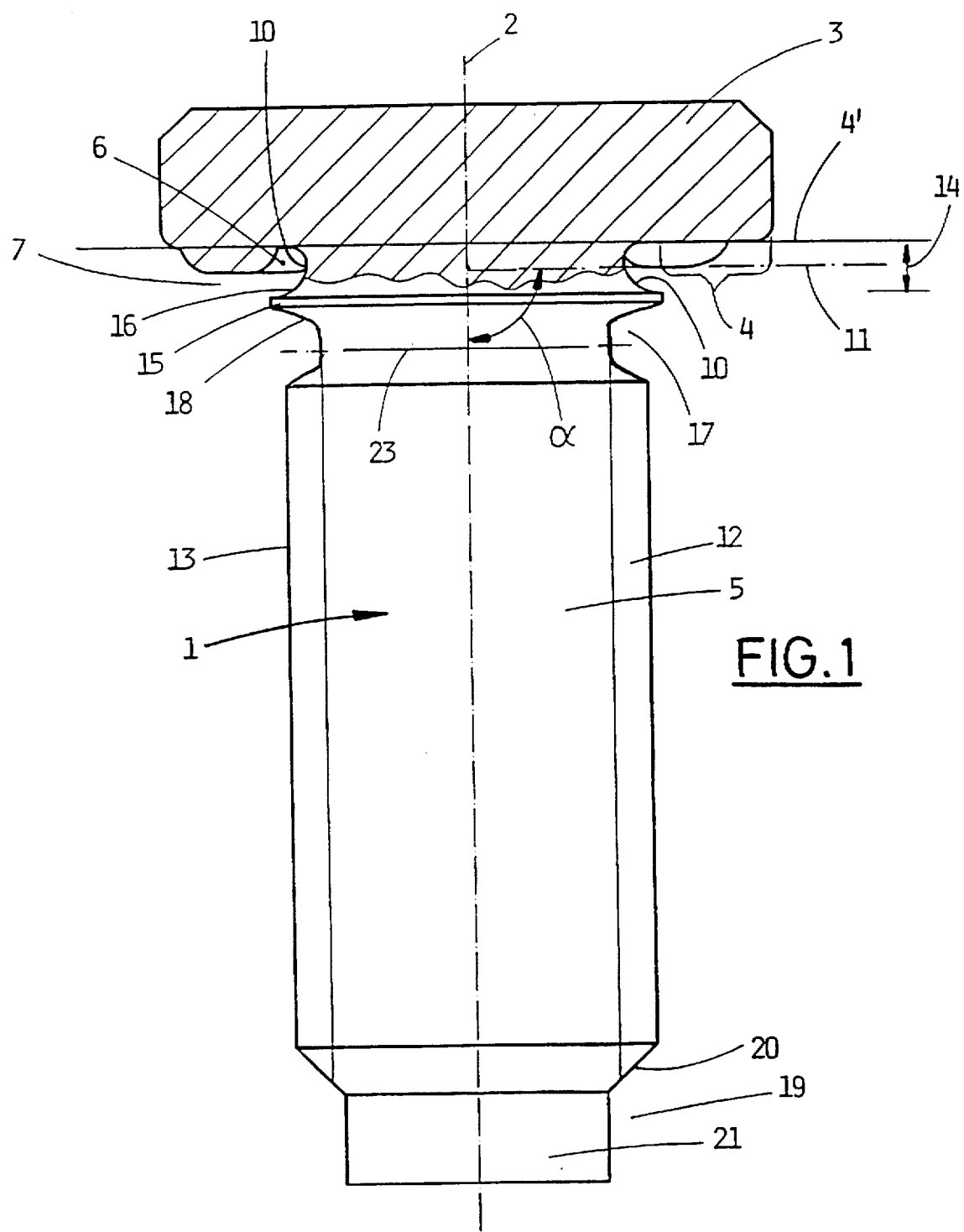

The insert element shown in FIG. 1 is embodied as an insert screw. It will be called "screw" 1 for short hereinbelow. The screw 1 has, arranged around a common longitudinal axis 2, a screw head 3 of larger diameter with a seating surface 4 essentially radial in relation to the longitudinal axis 2 and with a shank 5 of lesser diameter, which is concentric in respect to the longitudinal axis 2 and projects on one side in the axial direction beyond the seating surface 4. A constriction also referred to as recess, groove and (annular space 6), which is concentric in respect to the longitudinal axis 2 and is radially open toward the exterior, is disposed in the transition area between the screw head 3 and the shank 5. This constriction is used as the annular space 6 for receiving the sheet metal material during the joining of the screw 1 with the flat stock (hereinafter indicated by "sheet metal piece"). The annular space 6 extends in the axial direction, starting on the shank side, from an area not enclosed by the screw head 3 as far as the plane 4' spreading out from the seating surface 4. Projections 8 (FIGS. 2 and 3) shaped as elongated beads extend out of the seating surface 4 outside of the shank diameter and are distributed over the circumference of the head. In the connected state they are interlockingly embedded in the sheet metal piece 9 (FIGS. 4 et seq.) and ensure the twisting resistance in relation to the sheet metal piece 9 by taking up the torque. In the exemplary embodiment of FIG. 1, the annular space 6 extends as far as the plane 4' spreading out from the seating surface 4. However, it is also conceivable that it extends past this plane 4' into the screw head 3. In the same way it is possible that the seating surface 4 does not extend at right angles in relation to the longitudinal axis 2, as illustrated in FIG. 1, but that it forms an acute angle with it which converges toward the top of the screw head 3. In this case the seating surface 4 is a portion of a generated cone surface. If, in what was said before, the top of the head part and in what follows the underside of the head part of an insert element are mentioned, this does not relate to the absolute position of the insert element in the connected state. Instead, top is understood to be the side of the head part which in the connected state faces away from the flat stock and underside the side facing the flat stock. The annular space 6 then can extend up to this imagined generated cone surface or extend past it into the screw head 3. The annular space 6 has the approximate cross-sectional shape of a trough with a rounded trough bottom 10. The center axis 11 of the trough shape forms an angle α of approximately 90° with the longitudinal axis 2. However, the trough shape can also be such that its center axis 11 forms a slightly acute angle α converging with the longitudinal axis 2 toward the top of the screw head.

The projections 8 extend out of the seating surface 4 in the form of elongated beads and extend approximately radially in respect to the longitudinal axis 2. The projections are distributed on the circumference of the head at equal distances from the circumference and extend almost completely over the entire width of the seating surface 4. An annular projection 15 extending in the radial direction is disposed at a distance 14 in relation to the seating surface 4 between the shank section 13 provided with a thread 12 and the screw head 3. It has a pointed, somewhat wedge-shaped cross-sectional shape. The flank 16 at the head side of the annular projection 15 forms the flank on the shank side of the annular space 6. The annular projection 15 extends in the radial direction beyond the circumference of the shank 5. Underneath the annular projection 15, the shank 5 has an annular groove 17 with a U-shaped cross section. The flank 18 on the shank side of the annular projection 15 forms the leg of the U on the head side of the annular groove 17. The other leg of the U of the annular groove 17 constitutes the thread end near the head of the thread 12. The center axis 23 of the U-shaped cross-sectional shape of the annular groove 17 extends approximately at right angles with the long axis 2. The free end 19 of the shank 5 makes a transition, together with a shoulder 20 which constitutes the thread end at the shank side of the thread 12, into an end piece 21 of lesser diameter.

Figure 2:
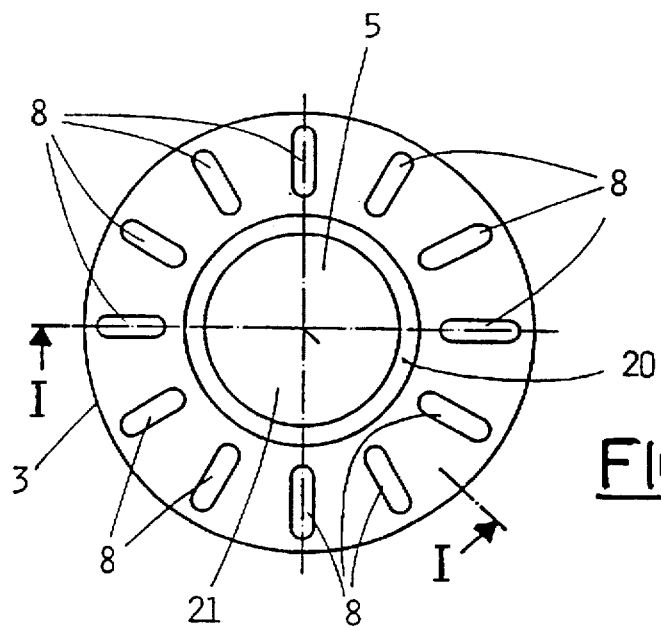
Figure 3:
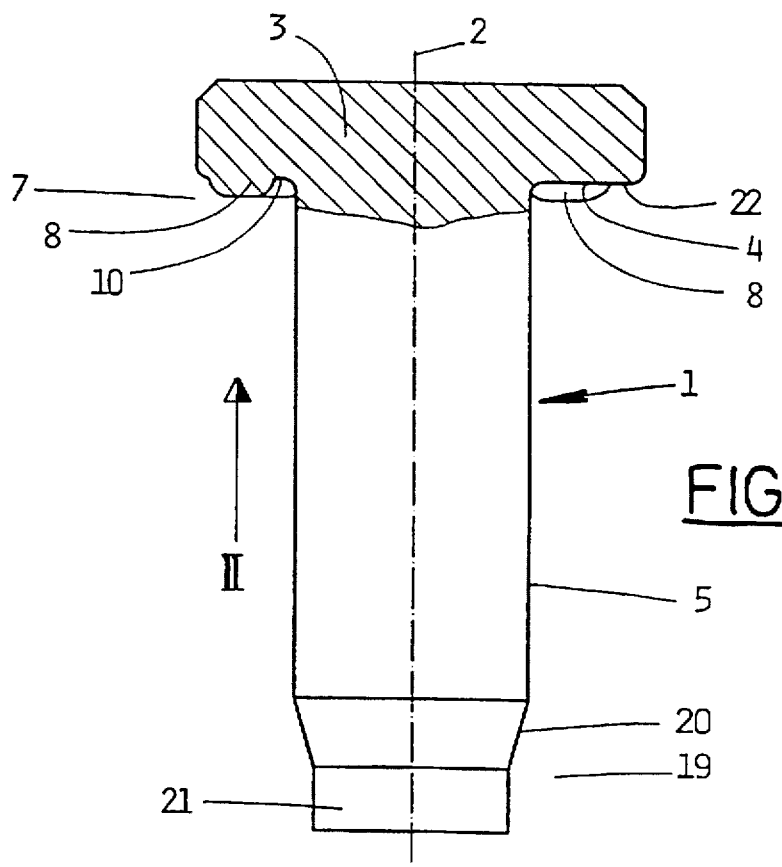

A blank of a screw 1 is represented in FIGS. 2 and 3. The underside of the screw head already has the projections 8 created by compression. To produce the finished screw, a thread 12 and the annular groove 17 are cut or rolled into the shank. This causes the material of the shank 5 to be displaced in the direction toward the screw head 3 and to be expanding in the radial direction in the course of this. The annular projection 15 is shaped in this way, whose flank 16, which is rounded in the form of a chamfer, forms the flank of the annular space 6 on the shank side. The interior diameter of the annular groove 17 is of such a size that it is less than the diameter of the thread core of an element with an inner thread which is to be screwed on.

Figure 4:
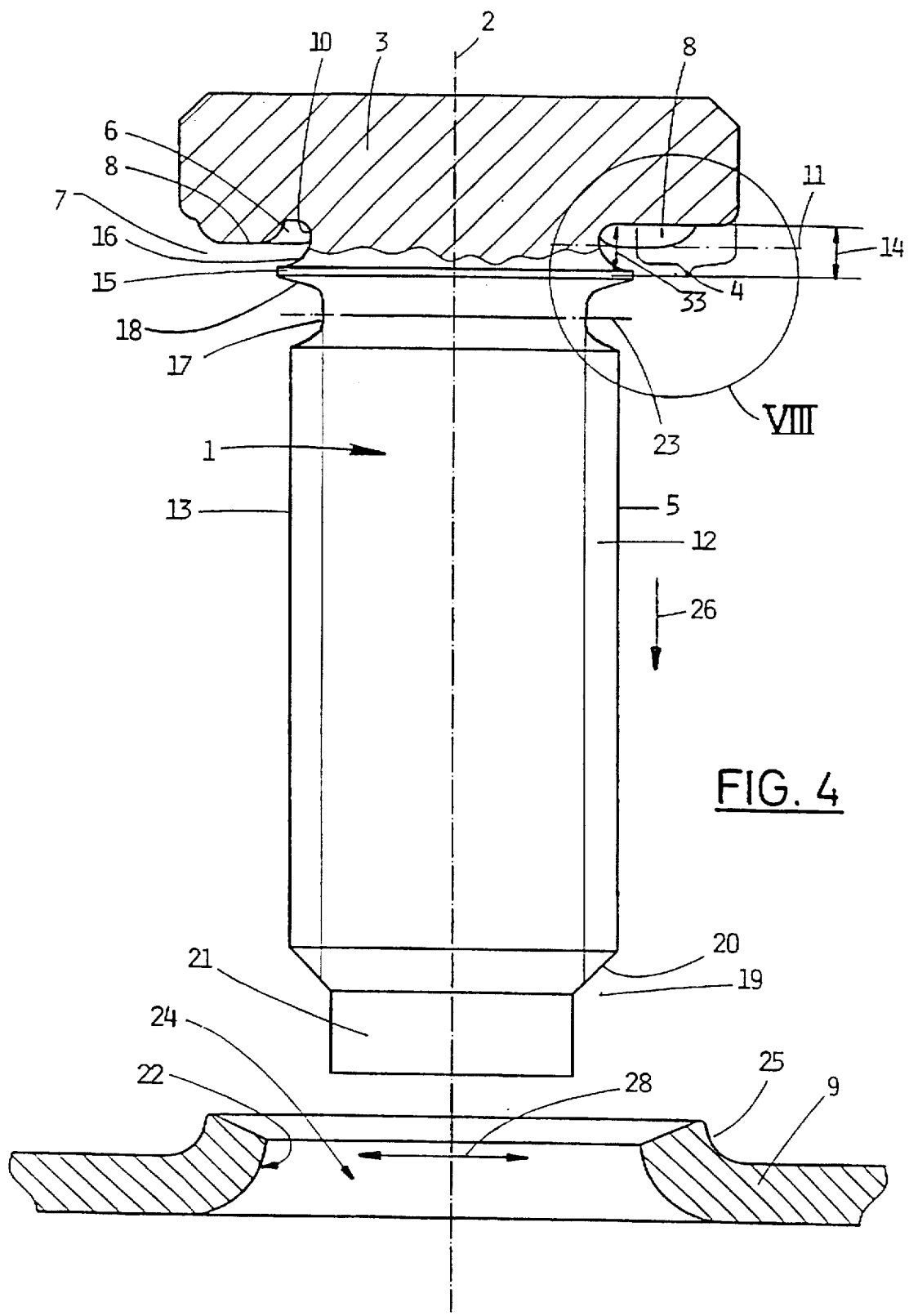
Figure 5:
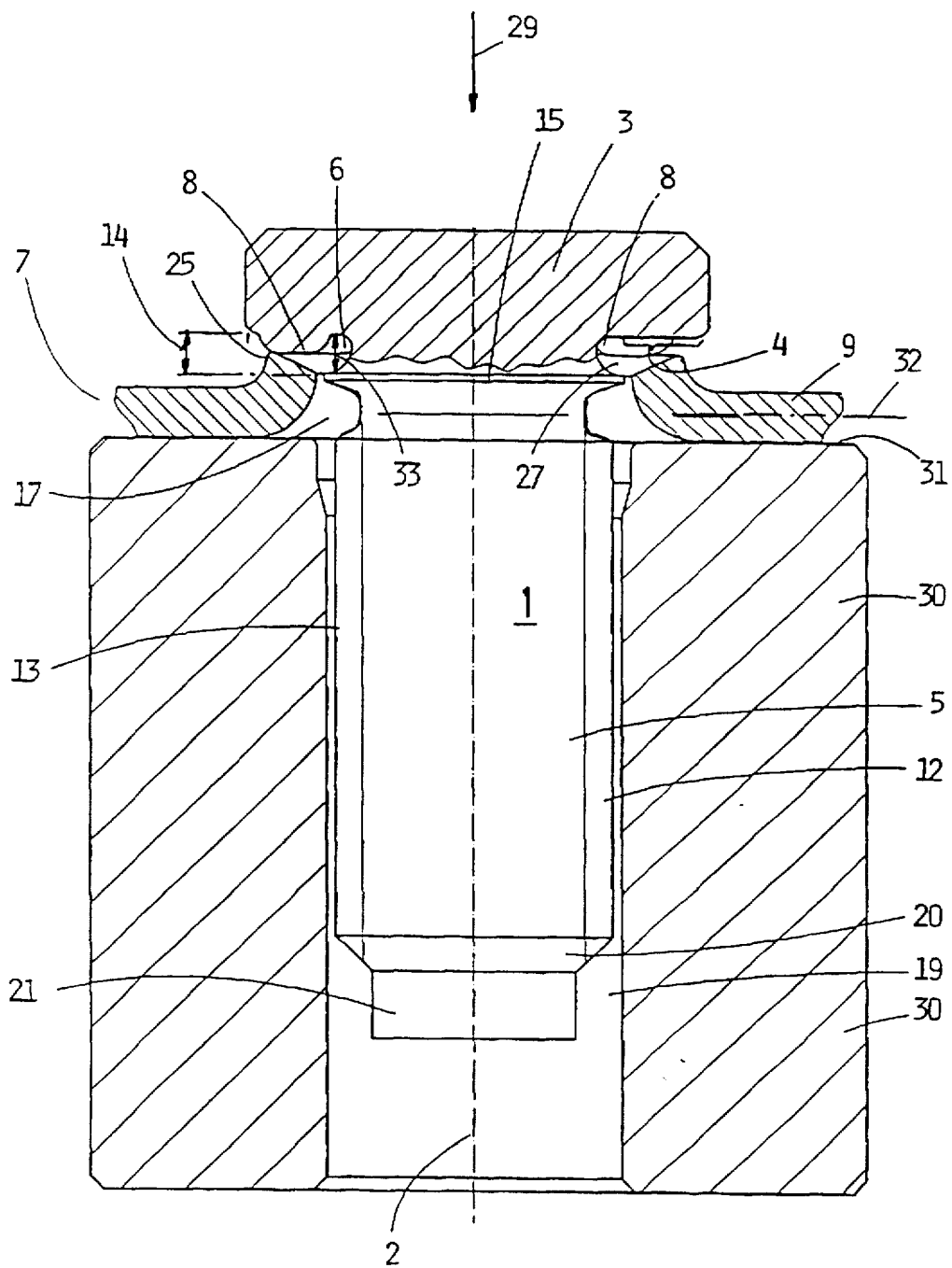
Figure 6:
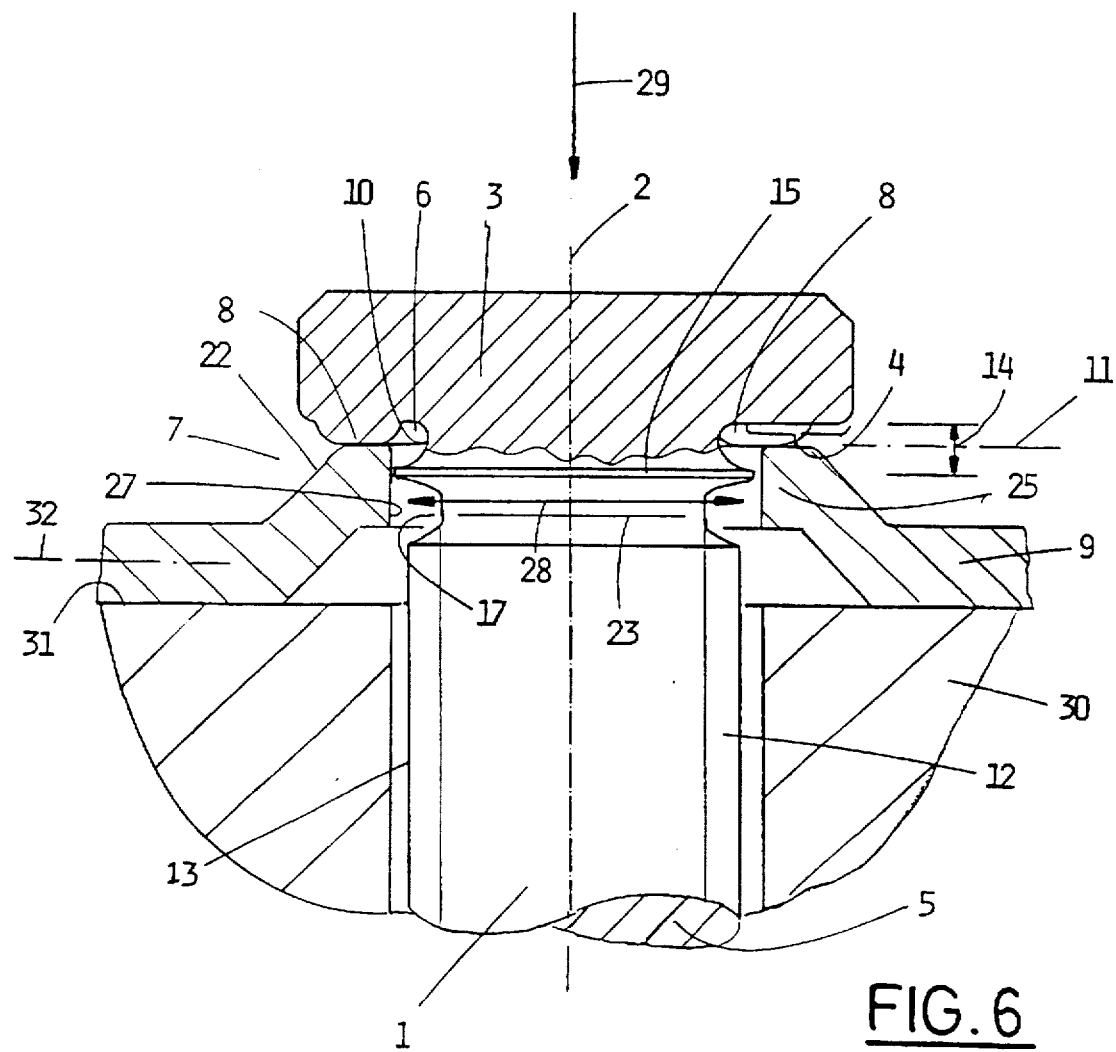
Figure 7:
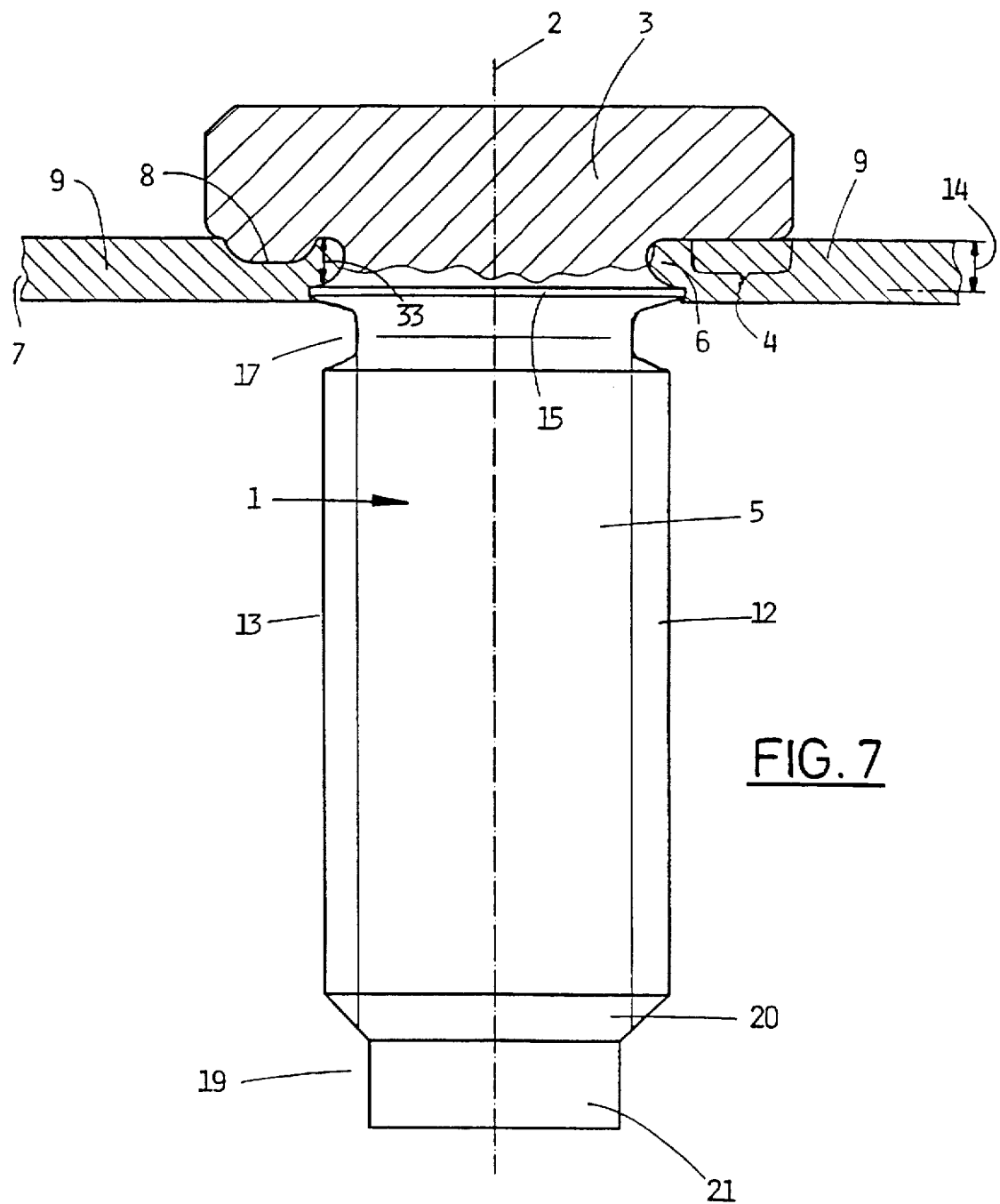

The individual process steps for inserting a screw in accordance with the invention into a sheet metal piece 9 can be seen in FIGS. 4 to 7. First the sheet metal piece is prepared in that it is provided with perforations 24 respectively associated with a screw 1 and having a collar 22. In the example illustrated in FIG. 4, first a perforation is made in the sheet metal piece by stamping or drilling and subsequently the perforation edge 25 is flanged open to form a collar 22. The latter can extend out of the sheet metal surface in the insertion direction 26 of the screw or, as illustrated in FIG. 4, counter to this direction. An alternate design of the collar 22 is shown in FIG. 6. In this case the edge 25 of the perforation of the collar 22 is bent inward in a radial direction in respect to the longitudinal axis 2, so that the wall 27 of the perforation extends approximately in a cylindrical shell surface disposed concentrically with the long axis 2. On the one hand, the advantage of this design lies in an increased buildup of material in the area of the perforation edge. On the other hand, the required force for making the joint is reduced in respect to the design of the collar in accordance with FIG. 4, because less deformation work need be performed. This has a positive effect on the service life of the tools.

The perforation diameter 28 is of such a size that the screw 1 can be inserted into the perforation 24 free of abrasion. In the case of surface-treated screws this can therefore take place without damaging their coating.

Providing the joint connection between the screw 1 and the sheet metal piece 9 takes place as follows: The screw head is put under pressure in the direction of the arrow 29 (FIG. 5) by means of a pressure ram (not shown). A patrix 30, shaped in the form of a hollow cylinder, is used as the counter tool, whose front 31 facing the screw head 3 is used as a seating surface for the sheet metal piece 9 or as a counter-surface for the pressure ram. The collar 22 is formed back into the sheet metal plane 32 when the screw is pressed in. In the process the perforation diameter 28 is reduced because of which the perforation wall 27 is pressed on the shank area adjoining the underside of the screw head 3. In the process the sheet metal stock flows into the annular space 6 and almost completely fills it. The projections 8 of the seating surface 4 completely penetrate into the sheet metal. An interlocking fixation against relative rotation of the screw 1 in the sheet metal piece 9 is achieved by means of this. The material displaced by the projections 8 additionally flows into the annular space 6 and assists in its complete filling. With sheet metal pieces of greater thickness than the distance 14 between the seating surface and the annular projection 15, the perforation wall 27 is interlockingly pressed on the annular projection 15 in the course of the joining process. The result is an even more effective interlocked meshing of the screw with the sheet metal support. In the course of later load, possibly in the direction of the sheet metal plane, causing the widening of the perforation 24, this interlocked meshing opposes the widening of the perforation and improves the sturdiness of the sheet metal connection. The interlocked meshing, which is effective over the entire circumference of the annular projection 15, in addition improves the watertight properties of the joint in accordance with the invention.

In the connected state the collar 22, which originally projected out of the sheet metal plane, has been formed back to such an extent, that for all practical purposes it extends completely in the sheet metal plane 32, especially between adjacent projections 8. In this way a level seating surface for connecting elements to be clamped on is available on the shank side of the sheet metal piece 9. This can be of advantage particularly when it is intended to clamp on electrical connecting elements, such as eyes of ground cables. The joint in accordance with the invention has a high degree of twisting resistance even with the thinnest sheet metal pieces whose thickness is even less than the distance 14. This is of particular advantage when screwing on self-locking nuts having an increased screw-on torque or when removing corroded joints in case of repairs.

A value which is a determinant for the ejection resistance is the shearing cross section 33, i.e the width of the annular space 6 in the axial direction. Because the projections 8 are disposed on the underside of the screw head 3 outside of the annular space 6, there is nowhere a weakening of the shearing cross section 33 which acts in the axial direction, and thus of the ejection resistance of the joint.

Figure 8:
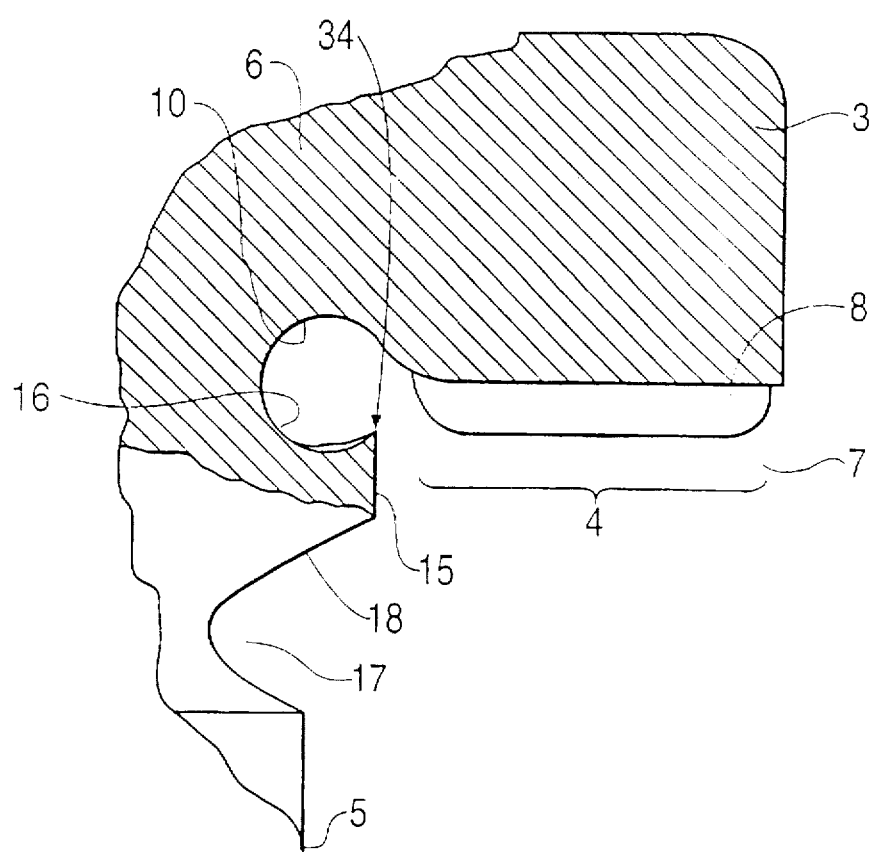

Another additional step increasing the total strength of the joint lies in that the annular projection 15, which beads up during the cutting of the annular groove 17, is prevented from further radial expansion by a grooved rolling acting on it radially inward. In the course of this the excess material is unavoidably rerouted into a direction not acted upon by the rolling tool, i.e. in the direction toward the screw head 3. Because of this a sharp axial ridge 34 (FIG. 8) is created on the flank 16 on the head side of the annular projection 15, and projects in the direction toward the screw head. During inserting the screw 1 this results in an even more effective interlocked meshing with the sheet metal support during a subsequent load on the shank in the approximate direction of the sheet metal plane 32.

Figure 9:
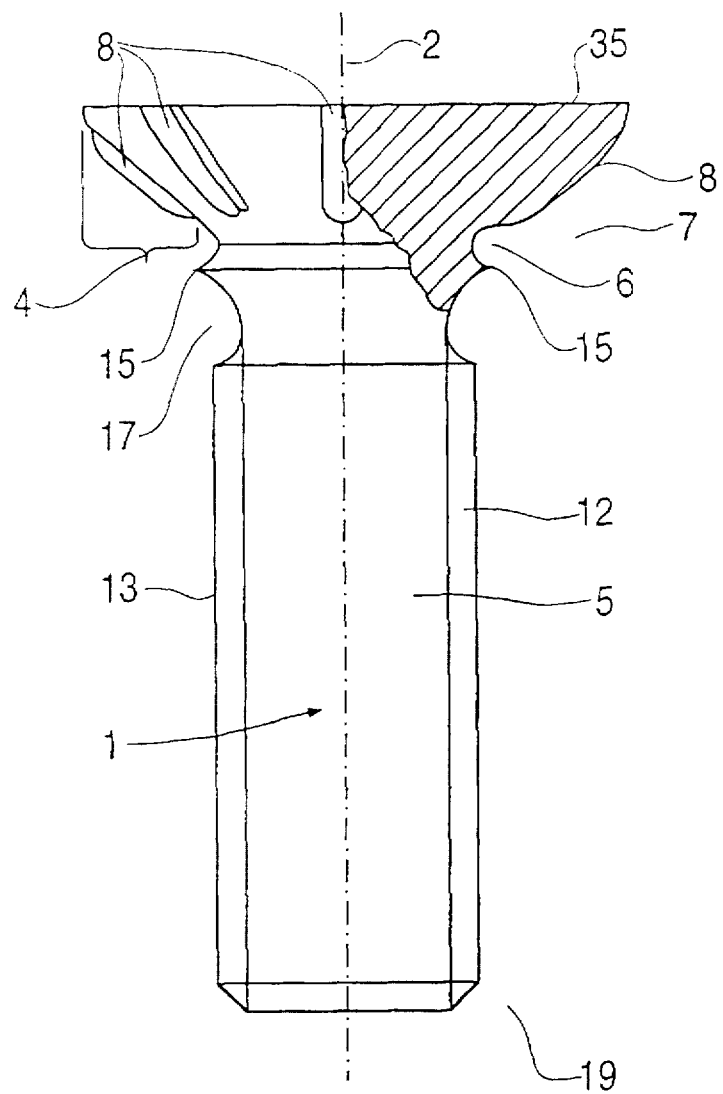

FIG. 9 shows an exemplary embodiment of a screw in accordance with the invention with a countersunk head 35. The underside of the screw extends in a generated cone surface which converges in the shank direction. Projections 8 in the form of elongated beads project from the seating surface 4 and extend in the radial direction across nearly the entire width of the seating surface 4 and are distributed with even spacing on the circumference of the head. After inserting a screw embodied in this manner, the top of the screw head is flush with the level of the top of the sheet metal piece 9 facing the screw head.

Figure 10:
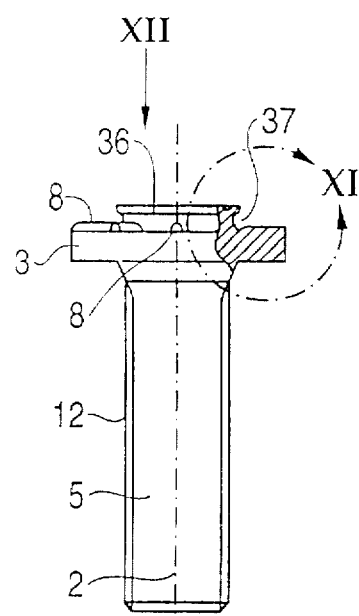
Figure 12:
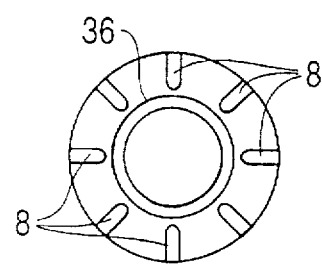
Figure 11:
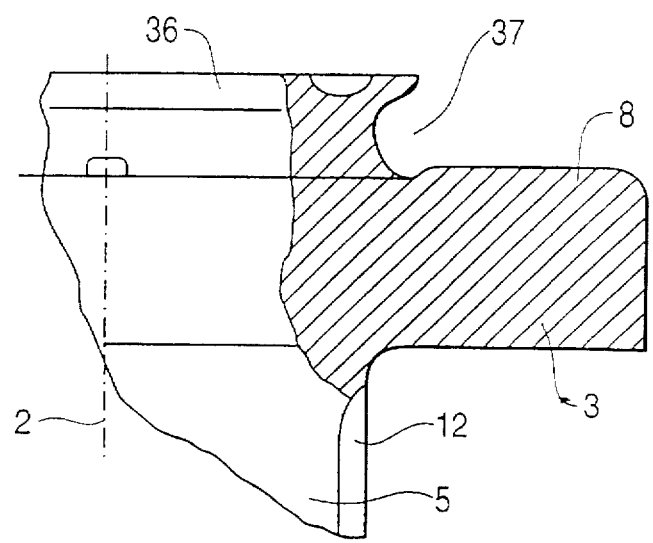
Figure 13:
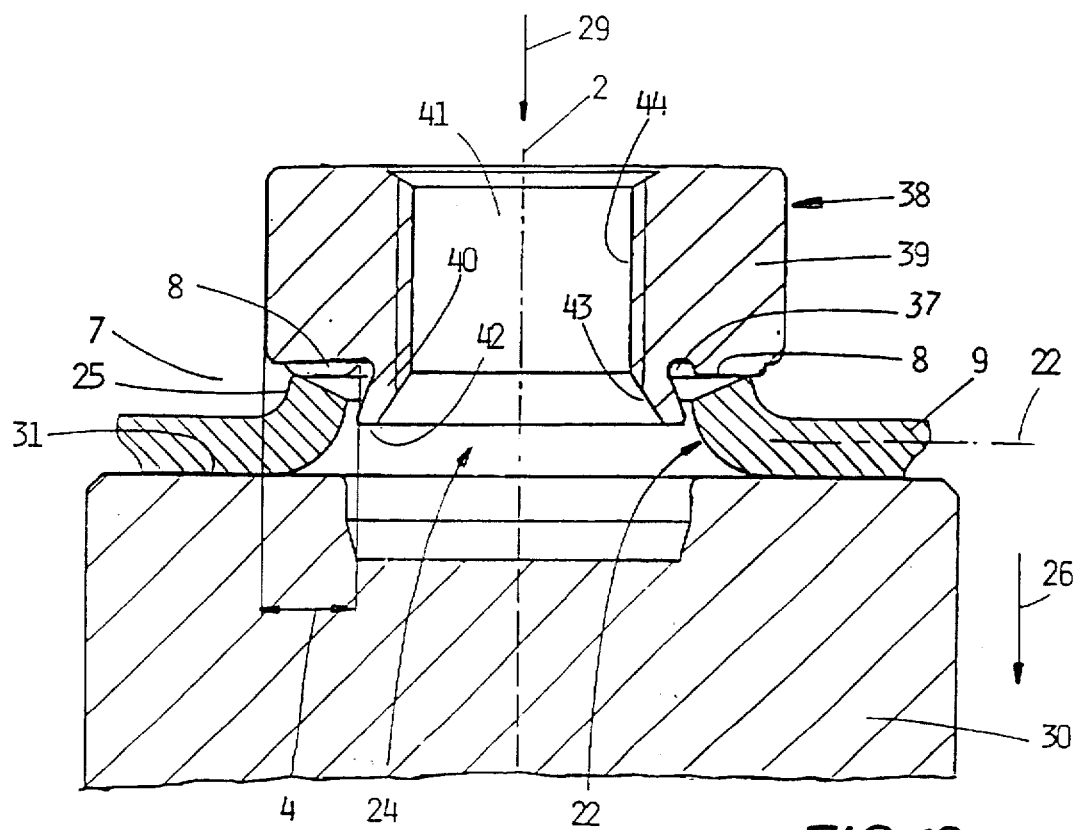
Figure 14:
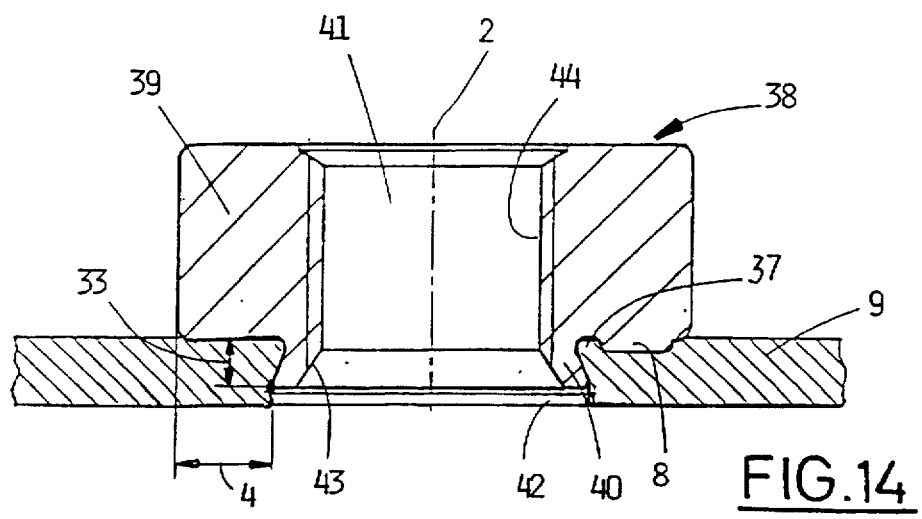

A further embodiment of the screw in accordance with the invention is illustrated in FIG. 10 to FIG. 12. The screw has an additional shank part 36, which is concentric in respect to the longitudinal axis 2 and projects in the axial direction out of the top of the screw. An annular space 37 for receiving sheet metal material is disposed in the transition area between the screw head 3 and the shank part 36 and is concentric to the longitudinal axis 2. The design of this annular space 37 corresponds to that of the annular space 6. Screws of this type are therefore inserted into a sheet metal support with the top of their heads. Preparation of the sheet metal piece and the insertion process are performed in the same way as with the exemplary embodiment of FIG. 4 to FIG. 7. The advantage of this embodiment mainly lies in that the underside of the screw head 3, which in this case faces away from the sheet metal in the connected state, is available as a defined level seating surface, for example for electrical connecting eyes. In connection with such electrical contact elements it is necessary, in view of good electrical contact, to strive for a level seating over as large a surface as possible.

The representations of FIG. 13 to FIG. 17 relate to an insert element embodied as an element with an interior thread, hereinafter called a "nut" 38 for short. The nut 38 contains, essentially disposed around a common longitudinal axis 2, a head part 39 of a larger diameter and a hollow shank 40 protruding from the underside of the head part 39. A through-bore 41 with an inner thread 44 extends through the head part 39 and hollow shank 40. On its free end 42 the hollow shank has an interior countersinking 43. In addition, the free end 42 of the hollow shank 40 is widened, C tapered i.e. its exterior diameter continuously increases, starting at the underside of the head part 39, towards the free end 42. An annular space 37 which approximately corresponds to the above described annular space 6 is created in this way in the transition between the head part 39 and the hollow shank 40 for receiving the material of a sheet metal piece in the connected state. As with a screw, for example in accordance with claim 1, projections 8 in the form of elongated beads extend out of the underside of the head part 39 which extend in the radial direction over almost the entire width of the seating surface 4 of the head part 39 and which are distributed with even spacing over its circumference.

Figure 15:
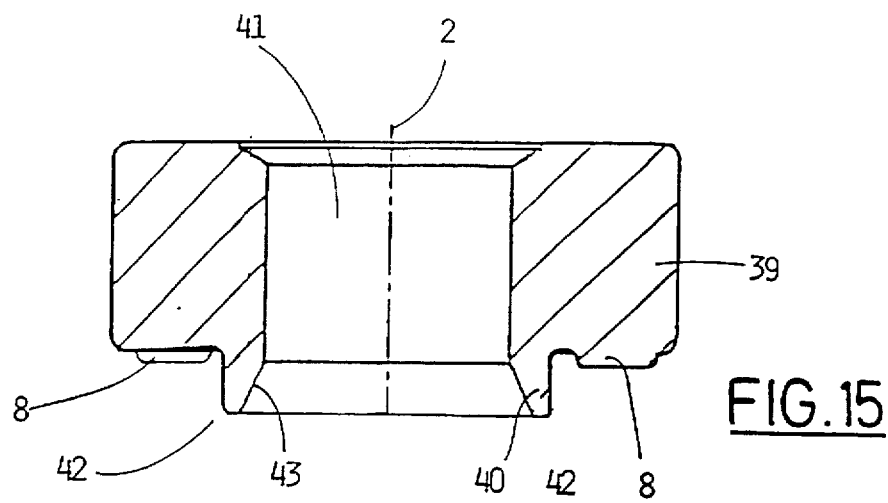
Figure 16:
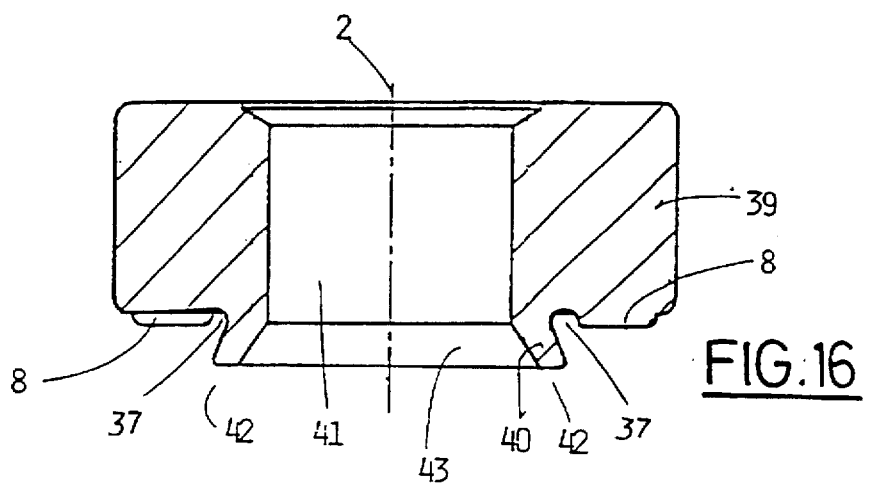
Figure 17:
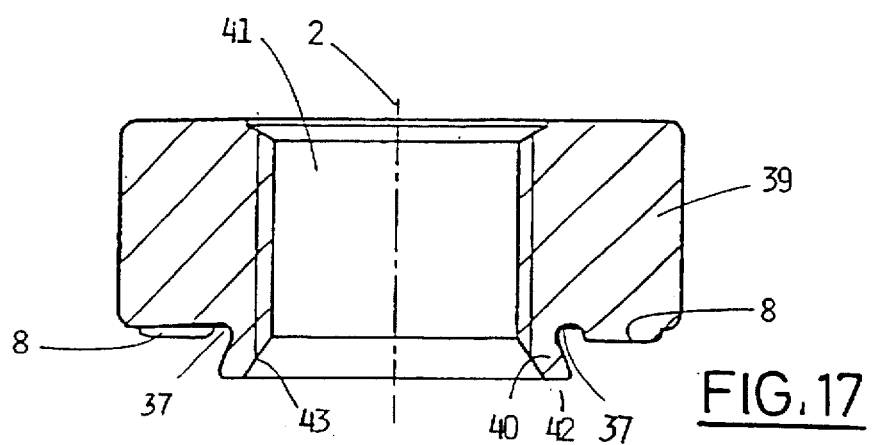

The production of a nut in accordance with the invention can be schematically seen in the sequence of representations of FIG. 15 to FIG. 17. The blank nut illustrated in FIG. 15 has an underside which has already been shaped by compression, for example. Its hollow shank 40 is provided with an interior countersinking 43, but not yet widened. The hollow shank is widened by means of a compression acting on the free end 42 of the hollow shank 40 in the direction of the longitudinal axis 2, and is given the shape shown in FIG. 16.

Inserting into a sheet metal piece basically takes place in the same way as with a screw. Here, too, the collar 22 (FIGS. 13 and 14) of the sheet metal piece 9 is pressed against the front of a counter-tool by an action on the top of the head part 39 in the direction of the longitudinal axis 2, in the course of which the perforation diameter is reduced and sheet metal material is pressed into the annular space 37 to form an undercut assuring the ejection resistance. With sheet metal pieces of greater thickness, the perforation edge 25 is additionally pressed against the widened free end 42 of the hollow shank 40, as can be seen from FIG. 14, producing an interlocked connection. Here, too, this interlocked connection between the widened free end 42, which in respect to its function corresponds to the previously mentioned annular projection 15 of a screw, and the perforation edge 25 results in an improvement of water tightness and an increase in the overall sturdiness of the connection.

I claim:

1. A process for inserting an insert element having a longitudinal axis and comprising one of a bolt, a screw, and a nut having an interior thread, into a flat sheet metal piece to form a connected element, comprising the steps of:

providing the insert element with a head coaxially positioned on the longitudinal axis, and having a width defining a first diameter, and a seating surface extending essentially radially relative to the longitudinal axis; a shank connected to and concentric to the head and having a width defining a second diameter smaller than the first diameter, the shank axially extending on one side of the head from the seating surface; a transition area defined by the connection between the head and the shank, the transition area having a concentric annular groove forming a constriction, the groove being open toward an exterior of the insert element for receiving the sheet metal piece; and a plurality of separate projections circumferentially arranged on the seating surface in an area beyond the width of the shank and providing a twisting resistance between the insert element and the sheet metal piece, each separate projection having a length that extends approximately radially relative to the longitudinal axis;

providing the sheet metal piece with a perforation for receiving the shank and having a diameter sized to allow the shank to pass therethrough, the perforation having an edge bent up in a direction toward the head to form a collar projecting out from a plane defined by a surface of the sheet metal piece;

inserting the shank through the perforation;

pressing the shank in the longitudinal direction toward the sheet metal piece causing the collar to be bent in a direction toward the plane so that the collar is essentially level with the surface of the sheet metal piece in a region between adjacent projections, and so that the seating surface firmly rests against the surface of the sheet metal piece; whereby said pressing step causes a reduction in the perforation diameter so that the collar fills the annular groove, so that only the projections enter the sheet metal piece in axial direction, and so that the annular groove extends from a shank side of the insert element to the plane defined by the surface of the sheet metal piece; and forming the connected element so that the insert element and the sheet metal piece are nonrotatably and nonejectably connected together.

2. A process as defined in claim 1, wherein, prior to said inserting step, the edge of the perforation is inwardly bent in an approximately radial direction relative to the longitudinal axis.

3. A process as defined in claim 1, wherein the perforation diameter is larger than the shank diameter so that the shank can be inserted into the perforation during said inserting step free of abrasion.

\* \* \* \* \*

UNITED STATES PATENT AND TRADEMARK OFFICE
CERTIFICATE OF CORRECTION

PATENT NO. : 5,797,175
DATED : August 25, 1998
INVENTOR(S) : Wilhelm SCHNEIDER

It is certified that error appears in the above-identified patent and that said Letters Patent is hereby corrected as shown below:

ON THE TITLE PAGE:

In section [63], after "abandoned", insert -- filed as PCT/DE93/00602 July 7, 1993. --

Signed and Sealed this

Twenty-third Day of February, 1999

Attest:

Q. TODD DICKINSON

Attesting Officer

Acting Commissioner of Patents and Trademarks